US012753279B2

(12) United States Patent
Mondrzyk et al.

(10) Patent No.: US 12,753,279 B2
(45) Date of Patent: Oct. 6, 2026

(54) POLYETHERETHERKETONES

(71) Applicant: Evonik Operations GmbH, Essen (DE)

(72) Inventors: Adam Mondrzyk, Dorsten (DE); Marco Gensheimer, Duisburg (DE); Wolfgang Diekmann, Waltrop (DE)

(73) Assignee: Evonik Operations GmbH, Essen (DE)

( * ) Notice: Subject to any disclaimer, the term of this patent is extended or adjusted under 35 U.S.C. 154(b) by 765 days.

(21) Appl. No.: 18/005,333

(22) PCT Filed: Jul. 13, 2021

(86) PCT No.: PCT/EP2021/069492
§ 371 (c)(1),
(2) Date: Jan. 12, 2023

(87) PCT Pub. No.: WO2022/013234
PCT Pub. Date: Jan. 20, 2022

(65) Prior Publication Data
US 2023/0279180 A1 Sep. 7, 2023

(30) Foreign Application Priority Data
Jul. 16, 2020 (EP) .................................... 20186169

(51) Int. Cl.
*C08G 65/40* (2006.01)

(52) U.S. Cl.
CPC .................................... *C08G 65/40* (2013.01)

(58) Field of Classification Search
CPC ................ C08G 65/40; C08G 65/4012; C08G 65/4093; C08G 65/46; C08G 65/4043; C08J 5/42; C08J 5/43; C08J 5/24
See application file for complete search history.

(56) References Cited

U.S. PATENT DOCUMENTS

| | | | |
|---|---|---|---|
| 5,290,906 A | 3/1994 | Matsumura et al. | |
| 2006/0134419 A1 | 6/2006 | Monsheimer et al. | |
| 2020/0079726 A1* | 3/2020 | Yang .................... | C07D 209/50 |

FOREIGN PATENT DOCUMENTS

| | | |
|---|---|---|
| CN | 1827689 A | 9/2006 |
| JP | S62-11726 | 1/1987 |
| WO | 89/04848 | 6/1989 |

OTHER PUBLICATIONS

Niu Yaming, “Research on Molecular Designs and performances of Naphthalene-Ring-Containing Polyaryl ether ketone and Polyaryl ether sulfone Polymers”, Doctoral Dissertations & Master’s Theses Full-text Database (Doctor) Engineering Science and Technology collection I, vol. 6, Published between Sep. 16, 2005 and Oct. 15, 2005, 57 pages with translation.
International Search Report dated Oct. 15, 2021, in PCT/EP2021/069492, with English translation, 7 pages.
Liu Si-Jie et al., “Synthesis and Properties of Poly(aryl ether ketone) Copolymers Containing 2,7-Naphthalene Moieties”, Chem. Res. Chinese U., vol. 22, No. 1, 2006, pp. 114-117.
Liu Si-Jie et al., “Crystallization Kinetics of Novel Poly(aryl ether ketone) Copolymers Containing 2,7-Naphthalene Moieties”, Journal of Applied Polymer Science, vol. 102, 2006, pp. 2527-2536.
Written Opinion dated Oct. 15, 2021, in PCT/EP2021/069492, with English translation, 15 pages.

* cited by examiner

*Primary Examiner* — Shane Fang
(74) *Attorney, Agent, or Firm* — Grüneberg Global IP, PLLC

(57) ABSTRACT

Polyether ether ketone copolymers can have the following formula (I), $$-\!\!\left[Ar_1-O-Ar_2-O\right]_n\!\!- \quad (I)$$

Therein, $Ar_1$ contains 75 to 98 mol %, preferably 78 to 97 mol %, of 1,4-phenylene groups and 2 to 25 mol %, preferably 3 to 22 mol %, of X,Y-naphthylene groups. In the X,Y-naphthylene groups, X≠Y, X and Y independently of one another are an integer value of 1 to 10, and 2,7-naphthylene groups are excluded. The mol % values relate to the amount of substance of $Ar_1$, wherein all $Ar_1$ groups sum to 100 mol %. The constituent $Ar_2$ contains 2,2'-bisphenylmethanone groups, 2,4'-bisphenylmethanone groups, 3,3'-bisphenylmethanone group, 4,4'-bisphenylmethanone groups, or mixtures thereof, preferably 4,4'-bisphenylmethanone groups. The index n is 10 to 10,000. The copolymers have a reduced melting point and are suitable for producing three-dimensional objects in powder bed fusion processes.

20 Claims, No Drawings

POLYETHERETHERKETONES

CROSS-REFERENCE TO RELATED APPLICATIONS

This application is the National Stage entry under § 371 of International Application No. PCT/EP2021/069492, filed on Jul. 13, 2021, and which claims the benefit of priority to European Application No. 20186169.7, filed on Jul. 16, 2020. The content of each of these applications is hereby incorporated by reference in its entirety.

BACKGROUND OF THE INVENTION

Field of the Invention

The present invention relates to polyether ether ketone copolymers, to a process for the production thereof, to the use thereof and to three-dimensional objects obtainable from the copolymers.

Description of Related Art

Additive manufacturing, especially the powder bed fusion process, requires materials which in-ter alia have a suitable melt viscosity range. If the melt viscosity is too low the melt flows over the predefined component boundaries into the surrounding powder bed, thus leading to powder encrustations and a low contour sharpness. An excessively high viscosity has the worst-case result that in the short time window of the molten state the powder particles hardly intermingle, if at all, thus producing a component of low density and insufficient mechanical properties.

Over the course of the build process the material undergoes changes on account of the relatively long-term thermal stress from the build space temperature which is typically around 20 K below the melting point. The changes also occur in high temperature polymers, in particular in the presence of oxygen. High-temperature polymers include polyaryl ether ketones, such as polyether ether ketone (PEEK), polyether ketone (PEK), polyether ketone ketone (PEKK) and polyether ketone ether ketone ketone (PEKEKK). Possible reaction mechanisms during thermal stress include post-polymerization and thermally or thermooxidatively mediated crosslinking and chain termination. This results for example in a change in melt viscosity. According to Arrhenius, elevated temperature accelerates the ageing reactions. In order to minimize changes in the material (and thus also ensure a certain recyclability of the material to enhance the economy of the process) it is thus advantageous a.) to employ an oxygen-free environment and b.) to keep the build space temperature as low as possible, i.e. employ low melting point materials for example.

SUMMARY OF THE INVENTION

It is accordingly an object of the invention to provide polyaryl ether ketones which do not exhibit the disadvantages of the prior art. Polyaryl ether ketones processable in a powder bed fusion process at relatively low temperature to achieve comparably good mechanical properties are to be provided.

The object is achieved by polyether ether ketone copolymers of formula (I)

$$-\!\!\left[ Ar_1 - O - Ar_2 - O \right]_n\!\!- \qquad (I)$$

Therein, $Ar_1$ comprises 75 to 98 mol %, preferably 78 to 97 mol % and particularly preferably 78 to 92 mol % of 1,4-phenylene groups and 2 to 25 mol %, preferably 3 to 22 mol % and particularly preferably 8 to 22 mol % of X,Y-naphthylene groups, wherein X≠Y and X and Y independently of one another assume an integer value of 1 to 10, and preferably independently of one another assume an integer value of 1 to 8. 2,7-Naphthylene groups are excluded. Preferred naphthylene groups are selected from 1,5-naphthylene groups, 2,3-naphthylene groups and 2,6-naphthylene groups, wherein 2,3-naphthylene groups and 2,6-naphthylene groups are particularly preferred and 2,3-naphthylene groups are very particularly preferred. The reported values relate to the amount of substance of $Ar_1$ wherein all $Ar_1$ groups sum to 100 mol %. The constituent $Ar_2$ comprises 2,2'-bisphenylmethanone groups, 2,4'-bisphenylmethanone groups, 3,3'-bisphenylmethanone groups, 4,4'-bisphenylmethanone groups and mixtures thereof, preferably 4,4-bisphenylmethanone groups. The index n is 10 to 10 000.

DETAILED DESCRIPTION OF THE INVENTION

In one embodiment of the invention $Ar_1$ further comprises 1,3-phenylene groups or 1,2-phenylene groups. A compound (1) may comprise both 1,3-phenylene groups and 1,2-phenylene groups.

The compounds of formula (I) shall be employable and processable in the powder bed fusion process. It is thus important that the compounds exhibit particular viscosity properties. The in-ventive copolymers (I) therefore advantageously have a melt volume rate value (MVR) according to DIN EN ISO 1133 as a measure of melt viscosity at 380° C. between 0.2 m/10 min and 800 ml/10 min, wherein values between 5 ml/10 min and 200 m/10 min are preferred, between 5 ml/10 min and 120 ml/10 min are particularly preferred and between 10 ml/1 min and 100 ml/10 min are very particularly preferred. The contact pressure is 5 kg. A melt viscosity outside these limits results in the abovementioned disadvantages.

The compounds of formula (I) should moreover be able to withstand relatively lengthy periods of thermal stress. This may be simulated via oven ageing where the copolymers undergo a change in melt viscosity under a nitrogen atmosphere for 20 h at a temperature 20 K below the DSC melting point. The melt viscosity of copolymers according to the invention measured according to DIN EN ISO 1133 at 380° C. accordingly falls by not more than 60% compared to the melt viscosity before oven ageing. The reduction is preferably not more than 50%, particularly preferably 5-45%. The recited percentages apply analogously for measurements at 360° C. and 390° C. The contact pressure is 5 kg.

The copolymers according to the invention preferably have a polystyrene-equivalent weight-average molar mass of 3000 g/mol to 350 000 g/mol. The preferred polystyrene-equivalent weight-average molar mass is 5000 g/mol to 300 000 g/mol. Both masses are determinable by gel permeation chromatography according to the method which follows.

The copolymers according to the invention make it possible to reduce build space temperatures compared to known polyaryl ether ketones. The copolymers preferably have melting points of 250° C. to 330° C., preferably of 280° C. to 310° C. (measured by differential scanning calorimetry DSC according to DIN 53765 at a heating rate of 20 K/min).

Processing of the copolymers according to the invention in powder bed fusion processes requires that the copolymers are in powder form. It is preferable when the weight-average particle diameter $d_{50}$ is 10 μm to 120 μm, by preference 40 μm to 90 μm and preferably 50 μm to 80 μm. The $d_{50}$ value is determined by laser diffraction. Powders are obtainable by customary processes such as milling.

The polyether ether ketone copolymers of formula (I) may contain additives. These include powder flow additives such as $SiO_2$ or $Al_2O_3$, pigments such as $TiO_2$ or carbon black, heat stabilizers such as organophosphorus compounds, for example phosphites or phosphinates, flame retardants and fillers such as ceramic beads, glass beads, glass fibers or carbon fibers and minerals such as mica or feldspar. $SiO_2$ as a powder flow additive typically has a $d_{50}$ of 5 nm to 100 mm in the primary particle. Glass beads as fillers may have a $d_{50}$ of 10 μm to 800 μm.

The copolymers may have various end groups. It is possible here for the copolymers to have at least one end group selected from halides, preferably F or Cl, and OH. The end groups may be obtained via an excess of a monomer containing $Ar_1/Ar_2$. For example, the excess of one monomer reactant over the other monomer reactant may be up to 5 mol %, preferably up to 3 mol %.

The copolymers according to the invention may be used for example for producing three-dimensional objects in powder bed fusion processes.

The invention further provides a process for producing the polyether ether ketone copolymers of formula (I) according to the invention. This comprises reacting phenol derivatives with dihalobenzophenone derivatives as monomer reactants. The phenol derivatives comprise 75 to 98 mol %, preferably 78 to 97 mol %, of hydroquinone, particularly preferably 78 to 92 mol %, and 2 to 25 mol %, preferably 3 to 22 mol %, particularly preferably 8 to 22 mol %, of X,Y-naphthalene dihydroxide, wherein X≠Y and X and Y independently of one another assume an integer value of 1 to 10, with exclusion of 2,7-naphthylene dihydroxide, in each case based on the amount of substance of phenol derivatives, wherein the bisphenol derivatives sum to 100 mol %. It is preferable when X and Y independently of one another assume an integer value of 1 to 8. Preferred hydroxides are selected from 1,5-naphthalene dihydroxide, 2,3-naphthalene dihydroxide and 2,6-naphthalene dihydroxide, wherein 2,3-naphthalene dihydroxide and 2,6-naphthalene dihydroxide are particularly preferred and 2,3-naphthalene dihydroxide is very particularly preferred. The dihalobenzophenone derivatives comprise 2,2'-bisphenylmethanone halides, 2,4'-bisphenylmethanone halides, 3,3'-bisphenylmethanone halides, 4,4'-bisphenylmethanone halides and mixtures thereof, preferably 4,4-bisphenylmethanone halides. Preferred halides are F and Cl, and difluorobenzophenone derivatives are particularly preferred. The phenol derivatives and the dihalobenzophenone derivatives may be employed in equimolar amounts. Alternatively one of the derivatives may be used in an excess of up to 5 mol %, preferably up to 3 mol %, compared to the other.

The abovementioned reaction is preferably performed in the presence of alkali metal carbonates, alkali metal chlorides or mixtures thereof, wherein the alkali metal is preferably selected from lithium, sodium and potassium. It is preferable to employ carbonates, wherein sodium carbonate, potassium carbonate or mixtures thereof are particularly preferred.

The present invention further provides for the use of polyether ether ketone copolymers of formula (I)

$$-\!\!\left[Ar_1-O-Ar_2-O\right]_n\!\!- \quad (I)$$

for producing three-dimensional objects in powder bed fusion processes.

Therein, $Ar_1$ comprises 40 to 98 mol %, preferably 65 to 97 mol %, of 1,4-phenylene groups and 2 to 60 mol %, preferably 3 to 35 mol %, of X,Y-naphthylene groups, wherein X≠Y and X and Y independently of one another assume an integer value of 1 to 10, and preferably independently of one another assume an integer value of 1 to 8. Furthermore $Ar_1$ may comprise 75 to 98 mol %, preferably 78 to 97 mol % and particularly preferably 78 to 92 mol % of 1,4-phenylene groups and 2 to 25 mol %, preferably 3 to 22 mol % and particularly preferably 8 to 22 mol % of X,Y-naphthylene groups. Preferred naphthylene groups are selected from 1,5-naphthylene groups, 2,3-naphthylene groups, 2,6-naphthylene groups and 2,7-naphthylene groups, wherein 2,3-naphthylene groups, 2,6-naphthylene groups and 2,7-naphthylene groups are particularly preferred and 2,3-naphthylene groups and 2,7-naphthylene groups are particularly preferred. The reported values relate to the amount of substance of $Ar_1$, wherein all $Ar_1$ groups sum to 100 mol %. The constituent $Ar_2$ comprises 2,2'-bisphenylmethanone groups, 2,4'-bisphenylmethanone groups, 3,3'-bisphenylmethanone groups, 4,4'-bisphenylmethanone groups and mixtures thereof, preferably 4,4-bisphenylmethanone groups. The index n is 10 to 10 000. In one embodiment of the use invention $Ar_1$ further comprises 1,3-phenylene groups or 1,2-phenylene groups. A compound (I) may comprise both 1,3-phenylene groups and 1,2-phenylene groups.

The compound of formula (I) is used in the powder bed fusion process. It is thus important that the compounds exhibit particular viscosity properties. The copolymers (I) employed according to the invention therefore advantageously have a melt volume rate value (MVR) according to DIN EN ISO 1133 as a measure of melt viscosity at 380° C. between 0.2 ml/10 min and 800 ml/10 min, wherein values between 5 ml/10 min and 200 ml/10 min are preferred, between 5 ml/10 min and 120 ml/10 min are particularly preferred and between 10 ml/10 min and 100 ml/10 min are very particularly preferred. The contact pressure is 5 kg. A melt viscosity outside these limits results in the abovementioned disadvantages.

The employed compounds of formula (I) should moreover be able to withstand relatively lengthy periods of thermal stress. This may be simulated via oven ageing where the copolymers undergo a change in melt viscosity under a nitrogen atmosphere for 20 h at a temperature 20 K below the DSC melting point. The melt viscosity of copolymers according to the invention measured according to DIN EN ISO 1133 at 380° C. accordingly falls by not more than 60% compared to the melt viscosity before oven ageing. The reduction is preferably not more than 50%, particularly preferably 5-45%. The recited percentages apply analogously for measurements at 360° C. and 390° C. The contact pressure is 5 kg.

The copolymers employed according to the invention preferably have a polystyrene-equivalent weight-average molar mass of 3000 g/mol to 350 000 g/mol. The preferred polystyrene-equivalent weight-average molar mass is 5000 g/mol to 300 000 g/mol. Both masses are determinable by gel permeation chromatography according to the method which follows.

The copolymers employed according to the invention make it possible to reduce build space temperatures compared to known polyaryl ether ketones. The copolymers preferably have melting points of 250° C. to 330° C., preferably of 280° C. to 310° C. (measured by differential scanning calorimetry DSC according to DIN 53765 at a heating rate of 20 K/min).

Processing of the copolymers employed according to the invention in powder bed fusion processes requires that the copolymers are in powder form. It is preferable when the weight-average particle diameter $d_{50}$ is 10 μm to 120 μm, by preference 40 μm to 90 μm and preferably 50 μm to 80 μm. The $d_{50}$ value is determined by laser diffraction. Powders are obtainable by customary processes such as milling.

The employed polyether ether ketone copolymers of formula (I) may contain additives. These include powder flow additives such as $SiO_2$ or $Al_2O_3$, pigments such as $TiO_2$ or carbon black, heat stabilizers such as organophosphorus compounds, for example phosphites or phosphinates, flame retardants and fillers such as ceramic beads, glass beads, glass fibers or carbon fibers and minerals such as mica or feldspar. $SiO_2$ as a powder flow additive typically has a $d_{50}$ of 5 nm to 100 mm in the primary particle. Glass beads as fillers may have a $d_{50}$ of 10 μm to 800 μm.

The employed copolymers may have various end groups. It is possible here for the copolymers to have at least one end group selected from halides, preferably F or Cl, and OH. The end groups may be obtained via an excess of a monomer containing $Ar_1/Ar_2$. For example, the excess of one monomer reactant over the other monomer reactant may be up to 5 mol %, preferably up to 3 mol %.

The invention further provides three-dimensional objects which comprise the polyether ether ketone copolymers that are employed for use for production of three-dimensional objects in powder bed fusion processes.

EXAMPLE

A. Methods of Determination

Melting Point Tm

The determination was carried out by differential scanning calorimetry in the second heating run according to DIN 53765 in a Perkin Elmer DSC 7 apparatus. The heating rate was 20 K/min.

Melt Viscosity (Melt Volume Rate, MVR)

The determination was carried out according to DIN EN ISO 1133 at a melt temperature of 360° C./380° C./390° C. and a 5 kg contact pressure.

The oven ageing was performed under a nitrogen atmosphere (1 bar) for 20 h. The temperature was 20 K below the melting temperature.

Particle Size

The D50 value was determined by laser diffraction using a Malvern Mastersizer 3000. In a dry measurement 20 g to 40 g of a powder were added via an Aero S dry dispersing apparatus. The feed rate of the vibratory conveyor was 55% and the dispersing air pressure was 3 bar. A standard venturi nozzle was used for the dispersing. The measurement duration for the sample was seconds (150 000 individual measurements); the shading settings were 0.1% (lower limit) and 5% (upper limit). Evaluation was carried out using the Fraunhofer theory as volume distribution.

Molar Mass

For determination of Mw by GPC the following experimental setup was selected:

| | |
|---|---|
| Eluent | 80:20 chloroform/dichloroacetic acid |
| Columns | PSS polefin, 10 μm, linear xl, ID 8.0 mm × 50 mm<br>PSS polefin, 10 μm, linear xl, ID 8.0 mm × 300 mm<br>PSS polefin, 10 μm, linear xl, ID 8.0 mm × 300 mm<br>PSS polefin, 10 μm, linear xl, ID 8.0 mm × 300 mm |
| Pump | PSS SECcurity 1260 HPLC pump |
| Flow rate | 1.0 ml/min |
| Injection system | Agilent 1260 |
| Injection volume | 50 μl |
| Sample concentration | 3 g/l |
| Temperature | 25° C. |
| Detector | Agilent 1260 differential refractometer (RID) |
| Evaluation | PSS WinGPC UniChrom Version 8.3 |

Sample preparation: The samples were weighed out on an analytical balance and admixed with 4 ml of dichloroacetic acid. The samples were completely dissolved within 3 hours at 150° C. with gentle shaking. The cooled solutions are added to four times the volume of chloroform and prior to measurement filtered through a single use PTFE filter having a pore size of 1 μm.

Calibration and evaluation: A calibration curve with polystyrene standards was initially performed in the separating region of the column combination. Calculation of average molar masses and the distribution thereof is carried out with computer assistance by means of the strip method based on the polystyrene calibration curve.

B. Production of the Copolymers

Example 1

A 2 l steel reactor fitted with a stirrer, torque recorder, nitrogen inlet and nitrogen outlet was charged with diphenyl sulfone (670 g, 3.07 mol), hydroquinone (110.11 g, 1.00 mol), 4,4'-difluorobenzophenone (218.20 g, 1.00 mol) and sodium carbonate (117.65 g, 1.11 mol). The reactor was sealed and inertized. To this end the reactor was initially pressurized with 3 bar of nitrogen and the positive pressure subsequently released. This procedure was repeated six times. The contents were then heated to 150° C. at a heating rate of 5° C./min under nitrogen blanketing. The stirrer was started once the diphenyl sulfone had melted. The temperature of 150° C. was maintained for 50 minutes. After the hold phase the temperature was increased to 320° C. at 1° C./min. The end temperature was maintained until a predetermined torque difference was reached. After reaching the target torque difference the reaction product was discharged from the reactor into a stainless steel dish. Once the reaction product had cooled it was milled and washed with acetone and water. The reaction product was dried in an oven at 80° C. for 24 h. This process resulted in 200-250 g of a polymer powder.

Examples 2-4

The methodic procedure in examples 2-4 corresponded to that in example 1, in a departure from example 1, 5 to 20 mol % of hydroquinone were replaced by an X,Y-naphthylene.

The data from the examples are summarized in the following table. In all cases $Ar_2$ is a 4,4'-bisphenylmethanone group.

TABLE 1

Characteristics of the produced polymers and copolymers

| # | $n_1$ | $n_2$ | X, Y | Tm in ° C. | MVR in ml/10 min 360° C. | 380° C. | 390° C. | MVR in ml/10 min after ageing 360° C. | 380° C. | 390° C. | MVR reduction [%] 360° C. | 380° C. | 390° C. |
|---|---|---|---|---|---|---|---|---|---|---|---|---|---|
| 1* | 100 | — | — | 340 | 55 | 75 | 87 | 32 | 60 | 76 | 43% | 20% | 12% |
| 2 | 80 | 20 | 2.3 | 296 | — | 18 | 20 | — | 8 | 11 | — | 56% | 48% |
| 3a | 80 | 20 | 2.7 | 308 | 55 | 80 | 97 | 21 | 54 | 52 | — | 33% | 46% |
| 3b | 90 | 10 | 2.7 | 325 | — | 52 | 58 | — | 7.1 | 32 | — | — | 46% |
| 3c | 95 | 5 | 2.7 | 336 | 136 | 181 | — | 75 | 101 | — | 45% | 44% | — |
| 3d | 85 | 15 | 2.7 | 314 | — | 63 | 74 | — | 28 | 53 | — | 56% | 28% |
| 4 | 80 | 20 | 2.6 | 309 | 62 | 77 | — | 41 | 54 | — | 34% | 30% | — |

*non-inventive $n_1$: $Ar_1$ = 1,4-phenylene in mol %

$n_2$: $Ar_1$ = X,Y-naphthylene in mol %

The copolymers 2 to 4 have a lower melting point than the PEEK polymer of the prior art (comparative example 1). The copolymers in powder bed fusion processes may thus be processed and employed at a lower temperature than PEEK. Furthermore, the copolymers 2 to 4 show an MVR reduction of not more than 56% after ageing. They are therefore resistant to relatively lengthy periods of thermal stress.

The invention claimed is:

1. A polyether ether ketone copolymer of formula (I)

$$-\!\left[Ar_1-O-Ar_2-O\right]_n\!-, \qquad (I)$$

wherein $Ar_1$ comprises a) 75 to 98 mol % of 1,4-phenylene groups, and b) 2 to 25 mol % of X,Y-naphthylene groups, wherein X≠Y and X and Y independently of one another are an integer value of 1 to 10, wherein the X,Y-naphthylene groups exclude 2,7-naphthylene groups, in each case based on an amount of substance of $Ar_1$, wherein all $Ar_1$ groups sum to 100 mol %, $Ar_2$ comprises 2,2'-bisphenylmethanone groups, 2,4'-bisphenylmethanone groups, 3,3'-bisphenylmethanone groups, 4,4'-bisphenylmethanone groups, or a mixture thereof, and n is 10 to 10,000, and wherein if the polymer comprises end groups, then they are selected from the group consisting of a halide and OH.

2. The polyether ether ketone copolymer according to claim 1, wherein $Ar_1$ further comprise 1,3-phenylene groups or 1,2-phenylene groups.

3. The polyether ether ketone copolymer according to claim 1, wherein the polyether ether ketone copolymer comprises at least one end group selected from the group consisting of a halide and OH.

4. The polyether ether ketone copolymer according to claim 1, wherein $Ar_2$ is a 4,4'-bisphenylmethanone group.

5. The polyether ether ketone copolymer according to claim 1, wherein the polyether ether ketone copolymer has a melt volume rate (MVR) value, at 380° C. with 5 kg of contact pressure according to DIN EN ISO 1133, between 0.2 ml/10 min and 800 ml/10 min.

6. The polyether ether ketone copolymer according to claim 5, wherein after 20 h of oven ageing at 20 K below melting temperature, in nitrogen atmosphere, at 1 bar, the polyether ether ketone copolymer exhibits a reduction in the MVR value according to DIN EN ISO 1133 measured at 380° C. of not more than 60%, compared to the MVR value before the oven ageing.

7. The polyether ether ketone copolymer according to claim 1, wherein a polystyrene-equivalent weight-average molar mass of the polyether ether ketone copolymer is 3,000 g/mol to 350,000 g/mol, determined by gel permeation chromatography.

8. The polyether ether ketone copolymer according to claim 1, wherein the polyether ether ketone copolymer has a melting point of 250° C. to 330° C., measured by differential scanning calorimetry according to DIN 53765 at a heating rate of 20 K/min.

9. The polyether ether ketone copolymer according to claim 1, wherein the polyether ether ketone copolymer is in the form of a powder and a weight-average particle diameter $d_{50}$ measured by laser diffraction is 10 μm to 120 μm.

10. The polyether ether ketone copolymer according to claim 1, further containing at least one additive selected from the group consisting of a powder flow additive, a pigment, a heat stabilizer, a filler, and a mineral.

11. The polyether ether ketone copolymer according to claim 1, wherein the X,Y-naphthylene groups are selected from the group consisting of 1,5-naphthylene groups, 2,3-naphthylene groups, and 2,6-naphthylene groups.

12. A process for producing the polyether ether ketone copolymer according to claim 1, the process comprising:

reacting phenol derivatives with dihalobenzophenone derivatives, wherein the bisphenol derivatives comprise 75 to 98 mol % of hydroquinone, and 2 to 25 mol % of X, Y-dihydroxynaphthalene, wherein X≠Y and X and Y independently of one another are an integer value of 1 to 10, wherein the X,Y-dihydroxynaphthalene excludes 2,7-dihydroxynaphthalene, in each case based on an amount of substance of the bisphenol derivatives, wherein the bisphenol derivatives sum to 100 mol %, and wherein the dihalobenzophenone derivatives comprise 2,2'-bisphenylmethanone halides, 2,4'-bisphenylmethanone halides, 3,3'-bisphenylmethanone halides, 4,4'-bisphenylmethanone halides, or a mixture thereof.

13. The process according to claim 12, wherein the reaction is performed in the presence of an alkali metal carbonate, an alkali metal chloride, or a mixture thereof.

14. A method, comprising:

fusing a powder bed to produce a three-dimensional object comprising a polyether ether ketone according to claim 1.

15. The method according to claim 14, wherein $Ar_1$ further comprise 1,3-phenylene groups or 1,2-phenylene groups.

16. The method according to claim 14, wherein $Ar_2$ is a 4,4'-bisphenylmethanone group.

17. A three-dimensional object, containing a polyether ether ketone copolymer of formula (I) according to claim 1.

18. The polyether ether ketone copolymer according to claim 1, which consists of the repeating units of formula (I) and the optional end groups.

19. The polyether ether ketone copolymer according to claim 1, which consists of the repeating units of formula (I).

20. The polyether ether ketone copolymer according to claim 1, wherein the polyether ether ketone copolymer is in the form of an isolated powder.

* * * * *